United States Patent
Fargo

(10) Patent No.: US 9,884,745 B2
(45) Date of Patent: Feb. 6, 2018

(54) SYSTEMS AND METHODS FOR DETERMINING FIELD ORIENTATION OF MAGNETIC COMPONENTS IN A ROPELESS ELEVATOR SYSTEM

(71) Applicant: Otis Elevator Company, Farmington, CT (US)

(72) Inventor: Richard N. Fargo, Plainville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/125,649

(22) PCT Filed: Mar. 14, 2014

(86) PCT No.: PCT/US2014/027995
§ 371 (c)(1),
(2) Date: Sep. 13, 2016

(87) PCT Pub. No.: WO2015/137969
PCT Pub. Date: Sep. 17, 2015

(65) Prior Publication Data
US 2017/0015526 A1    Jan. 19, 2017

(51) Int. Cl.
*B66B 11/04* (2006.01)
*H02K 41/03* (2006.01)
(Continued)

(52) U.S. Cl.
CPC ........ *B66B 11/0407* (2013.01); *H02K 11/215* (2016.01); *H02K 41/031* (2013.01); *B66B 9/00* (2013.01); *H02K 7/14* (2013.01)

(58) Field of Classification Search
CPC ..... B66B 11/0407; B66B 9/00; H02K 11/215; H02K 41/031
(Continued)

(56) References Cited

U.S. PATENT DOCUMENTS 2,908,900 A * 10/1959 Gordon .................. G09F 11/23
                                              187/399
4,630,026 A * 12/1986 Lewis .................... B66B 3/023
                                              187/399
(Continued)

FOREIGN PATENT DOCUMENTS

WO    WO 2008136692 A2 * 11/2008  ............... B66B 9/02
WO       2010104502 A1    9/2010
(Continued)

OTHER PUBLICATIONS

International Search Report and Written Opinion for application PCT/US2014/027924, dated Dec. 8, 2014, 11 pages.
(Continued)

*Primary Examiner* — David Warren
(74) *Attorney, Agent, or Firm* — Cantor Colburn LLP

(57) ABSTRACT

A ropeless elevator system, a propulsion system, and a method for operating a ropeless propulsion system are disclosed. The ropeless elevator system may include an elevator car, a hoistway in which the elevator car travels, and a ropeless propulsion system. The ropeless propulsion system may include electrical windings energized by a power source, the electrical windings affixed to a stationary structure, the stationary structure associated with the hoistway, and a magnet, the magnet affixed to a moving structure, the moving structure associated with the elevator car, and interaction between the electrical windings and the magnet generates a thrust force on the elevator car traveling in the hoistway. The ropeless elevator system may further include an array of Hall effect sensors, the array of Hall effect sensors determining a sensed magnetic field, the sensed magnetic field being associated with electrical currents carried by the windings and used to determine a magnetic (Continued)

field orientation of the electrical currents carried by the windings with respect to the magnet.

20 Claims, 9 Drawing Sheets

(51) Int. Cl.
*H02K 11/215* (2016.01)
*B66B 9/00* (2006.01)
*H02K 7/14* (2006.01)

(58) Field of Classification Search
USPC .......................................................... 189/289
See application file for complete search history.

(56) References Cited

U.S. PATENT DOCUMENTS

| | | | | |
|---|---|---|---|---|
| 5,197,570 | A * | 3/1993 | Matsui | B66B 9/003 187/249 |
| 5,203,432 | A * | 4/1993 | Grinaski | B66B 11/0055 187/251 |
| 5,234,079 | A * | 8/1993 | Nomura | B66B 5/18 187/250 |
| 5,235,226 | A * | 8/1993 | Olsen | B66B 11/0407 187/289 |
| 5,253,734 | A * | 10/1993 | Laurutis | A62B 1/02 187/239 |
| 5,668,421 | A * | 9/1997 | Gladish | B60L 13/10 104/23.2 |
| 5,751,076 | A * | 5/1998 | Zhou | B66B 11/0407 187/250 |
| 5,801,462 | A * | 9/1998 | Yagoto | H02K 41/03 310/12.04 |
| 5,808,381 | A * | 9/1998 | Aoyama | H02K 41/03 310/12.22 |
| 5,955,710 | A * | 9/1999 | DFranza | B66B 1/34 187/247 |
| 5,975,249 | A * | 11/1999 | Tomaseti | B66B 11/0206 187/401 |
| 5,979,607 | A * | 11/1999 | Allen | B66B 5/024 187/384 |
| 6,189,657 | B1 * | 2/2001 | Jessenberger | B66B 11/0407 187/289 |
| 6,305,501 | B1 * | 10/2001 | Kahkipuro | B66B 11/0407 187/250 |
| 6,625,517 | B1 * | 9/2003 | Bogdanov | B29C 65/02 324/207.21 |
| 6,742,631 | B2 * | 6/2004 | Grundmann | H02K 15/03 187/276 |
| 6,876,896 | B1 * | 4/2005 | Ortiz | B29C 65/02 318/135 |
| 7,261,186 | B2 * | 8/2007 | Deplazes | B60L 13/10 187/277 |
| 7,478,706 | B2 * | 1/2009 | Kocher | B66B 11/0407 187/276 |
| 7,628,251 | B2 * | 12/2009 | Kocher | B66B 11/0407 187/277 |
| 8,719,037 | B2 * | 5/2014 | Gazdzinski | G06Q 30/0251 187/396 |
| 8,738,276 | B1 * | 5/2014 | Boss | B61L 27/04 455/404.1 |
| 9,136,749 | B1 * | 9/2015 | Callier | H02K 35/02 |
| 2003/0057029 | A1 * | 3/2003 | Fujino | B66B 3/00 187/391 |
| 2005/0039987 | A1 * | 2/2005 | Redden | B66B 1/3492 187/394 |
| 2005/0087400 | A1 * | 4/2005 | Zhou | B66B 11/0407 187/277 |
| 2006/0163008 | A1 * | 7/2006 | Godwin | B66B 9/00 187/288 |
| 2006/0201751 | A1 * | 9/2006 | Kawai | B66B 5/024 187/313 |
| 2007/0227831 | A1 * | 10/2007 | Zaharia | B66B 1/3492 187/394 |
| 2008/0196978 | A1 * | 8/2008 | Siikonen | B66B 5/022 187/384 |
| 2011/0198167 | A1 | 8/2011 | Huppunen et al. | |
| 2012/0193172 | A1 * | 8/2012 | Matscheko | B60L 7/00 187/289 |
| 2012/0211311 | A1 * | 8/2012 | Piech | B66B 5/16 187/351 |
| 2015/0048953 | A1 * | 2/2015 | Murphy, Jr. | G08B 25/14 340/691.6 |
| 2015/0070001 | A1 * | 3/2015 | Villaret | G01D 5/145 324/207.2 |
| 2015/0114763 | A1 * | 4/2015 | Kim | B66B 5/0012 187/392 |
| 2016/0083226 | A1 * | 3/2016 | Piech | B66B 11/0407 187/250 |
| 2017/0015526 | A1 * | 1/2017 | Fargo | B66B 11/0407 |
| 2017/0036887 | A1 * | 2/2017 | Roberts | B66B 1/30 |
| 2017/0045493 | A1 * | 2/2017 | van der Woude | B66B 7/1215 |
| 2017/0057791 | A1 * | 3/2017 | Hsu | B66B 7/00 |
| 2017/0073187 | A1 * | 3/2017 | Youker | B66B 3/008 |
| 2017/0073193 | A1 * | 3/2017 | Kuczek | B66B 11/0407 |
| 2017/0088396 | A1 * | 3/2017 | Fargo | B66B 1/32 |
| 2017/0107080 | A1 * | 4/2017 | Steinhauer | B66B 9/003 |
| 2017/0109132 | A1 * | 4/2017 | Gazdzinski | G06F 3/167 |
| 2017/0158461 | A1 * | 6/2017 | Roberts | B66B 1/30 |
| 2017/0158462 | A1 * | 6/2017 | Roberts | B66B 1/30 |
| 2017/0190544 | A1 * | 7/2017 | Witczak | B66B 1/468 |
| 2017/0207691 | A1 * | 7/2017 | Hemati | H02K 41/0354 |
| 2017/0225927 | A1 * | 8/2017 | Kirsch | B66B 11/0407 |

FOREIGN PATENT DOCUMENTS

| | | |
|---|---|---|
| WO | 2010112675 A2 | 10/2010 |
| WO | 2011140887 A1 | 11/2011 |
| WO | 2013107930 A1 | 7/2013 |
| WO | 2015137967 A1 | 9/2015 |

OTHER PUBLICATIONS

International Search Report and Written Opinion for application PCT/US2014/027995, dated Dec. 8, 2014, 11 pages.

* cited by examiner

SYSTEMS AND METHODS FOR DETERMINING FIELD ORIENTATION OF MAGNETIC COMPONENTS IN A ROPELESS ELEVATOR SYSTEM

TECHNICAL FIELD OF THE DISCLOSURE

The present disclosure relates generally to elevator systems and, more particularly, to self-propelled elevator systems.

BACKGROUND OF THE DISCLOSURE

Self-propelled elevator systems, also referred to as ropeless elevator systems, are envisioned as useful in various applications, such as high rise buildings, where there is a desire for multiple elevator cars in a single hoistway portion of the elevator system. In high rise buildings, a conventional elevator may be prohibitive due to the mass of the ropes needed for function.

In ropeless elevator systems, a first hoistway may be designated for upward travel of the elevator cars while a second hoistway is designated for downward travel of the elevator cars. Further, transfer stations may be included to move the elevator cars horizontally between the first and second hoistways.

To propel the elevator car about the hoistway, ropeless elevator systems may employ linear motors to produce necessary thrust. The linear motors may include current carrying coils disposed about the hoistway and magnets disposed on one or more elevator cars. The interaction between the coils and the magnet(s) generates thrust. For proper operation, the respective magnetic poles of the coils and magnets must be properly aligned for proper field orientation. Therefore, systems and methods for determining field orientation of magnetic components in a ropeless elevator system are needed.

SUMMARY OF THE DISCLOSURE

In accordance with one aspect of the disclosure, a ropeless elevator system is disclosed. The ropeless elevator system may include an elevator car, a hoistway in which the elevator car travels, and a ropeless propulsion system. The ropeless propulsion system may include electrical windings energized by a power source, the electrical windings affixed to a stationary structure, the stationary structure associated with the hoistway, and a magnet, the magnet affixed to a moving structure, the moving structure associated with the elevator car, and interaction between the electrical windings and the magnet generates a thrust force on the elevator car traveling in the hoistway. The ropeless elevator system may further include an array of Hall effect sensors, the array of Hall effect sensors determining a sensed magnetic field, the sensed magnetic field being associated with electrical currents carried by the windings and used to determine a magnetic field orientation of the electrical currents carried by the windings with respect to the magnet.

In a refinement, the magnetic field orientation of the electrical currents carried by the windings with respect to the magnet may be used to determine if the electrical currents carried by the windings and the magnet are aligned for proper function of the propulsion system.

In a refinement, the magnetic field orientation of the currents carried by the windings with respect to the magnet is used to perform fault detection operations for the propulsion system.

In a refinement, the array of Hall effect sensors may be disposed on the elevator car.

In a further refinement, at least one member of the array of Hall effect sensors may be disposed in close proximity to a top portion of the moving structure.

In another further refinement, at least one member of the array of Hall effect sensors may be disposed in close proximity to a bottom portion of the moving structure.

In a refinement, the magnet may include a series of permanent magnets.

In a further refinement, the series of permanent magnets may be arranged in a Hallbach array.

In a refinement, the windings may be arranged in a multi-phase arrangement.

In accordance with another aspect of the disclosure, a method for operating a ropeless elevator system is disclosed. The ropeless elevator system may include an elevator car and a hoistway in which the elevator car travels. The method may include generating a thrust force on the elevator car traveling in the hoistway, wherein the thrust force is generated by a ropeless propulsion system, the ropeless propulsion system including electrical windings energized by a power source, the electrical windings affixed to a stationary structure, the stationary structure associated with the hoistway and a magnet, the magnet affixed to a moving structure, the moving structure associated with the elevator car and interaction between the electrical windings and the magnet generates the thrust force. The method may further include determining a sensed magnetic field, using an array of Hall effect sensors, the sensed magnetic field associated with electrical currents carried by the windings, and determining a magnetic field orientation of the electrical currents carried by the windings with respect to the magnet using the sensed magnetic field associated with the windings.

In a refinement, the method may further include determining if the electrical currents carried by the windings and the magnet are aligned for proper function of the propulsion system using the magnetic field orientation of the electrical currents carried by the windings with respect to the magnet.

In a refinement, the method may further include performing fault detection operations for the propulsion system using the magnetic field orientation of the electrical currents carried by the windings with respect to the magnet.

In a further refinement, the method may include performing an emergency stop operation of the elevator car if a fault is detected, the fault determined by the fault detection operations for the propulsion system.

In a refinement, the array of Hall effect sensors may be disposed on the elevator car.

In a refinement, the magnet may include a series of permanent magnets.

In a further refinement, the series of permanent magnets may be arranged in a Hallbach array.

In a refinement, the windings may be arranged in a multi-phase arrangement.

In a refinement, the method may further include determining, using the magnetic field orientation of the electrical currents carried by the windings with respect to the magnet, if the magnet is properly aligned with the windings prior to startup operations of the elevator car.

In accordance with another aspect of the disclosure, a propulsion system for a ropeless elevator system is disclosed. The propulsion system may include electrical windings energized by a power source, the electrical windings affixed to a stationary structure, a magnet, the magnet affixed to a moving structure and interaction between the electrical windings and the magnet generates a thrust force, and an array of Hall effect sensors, the Hall effect sensors determining a sensed magnetic field being associated with the electrical currents carried by the windings and used to determine a magnetic field orientation of the windings with respect to the magnet In a refinement, the magnet is a series of permanent magnets arranged in a Hallbach array.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

Furthermore, while the present disclosure is susceptible to various modifications and alternative constructions, certain illustrative embodiments thereof will be shown and described below in detail. The invention is not limited to the specific embodiments disclosed, but instead includes all modifications, alternative constructions, and equivalents thereof.

DETAILED DESCRIPTION OF THE DRAWINGS

Figure 1:
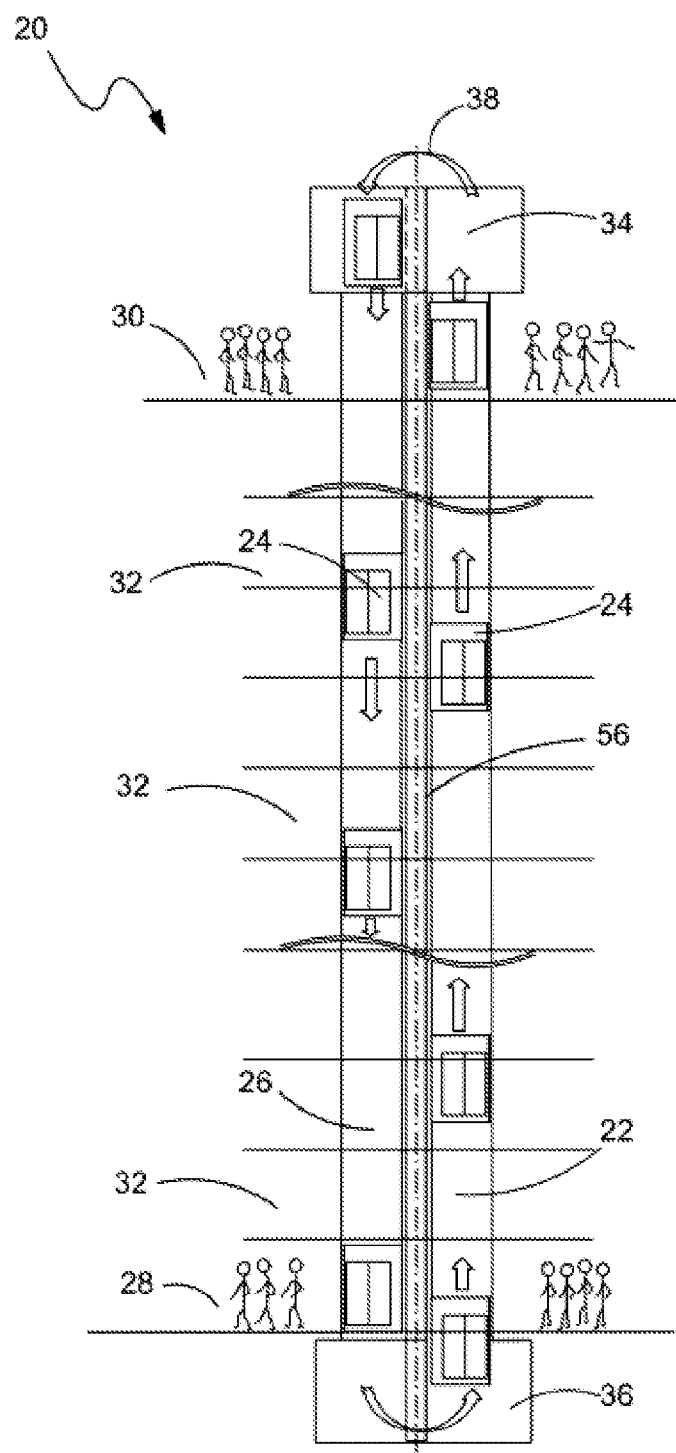
FIG. 1 is a ropeless elevator system according to an exemplary embodiment.
Figure 2:
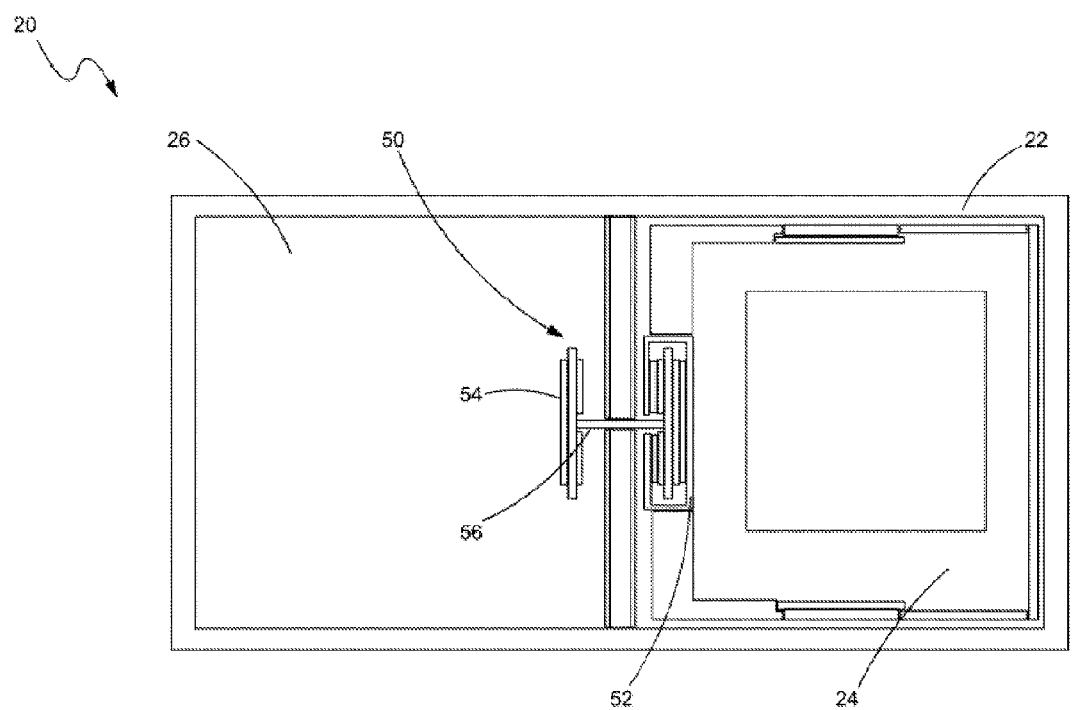
FIG. 2 is a top down view of an elevator car in a hoistway in an exemplary embodiment.
Figure 3:
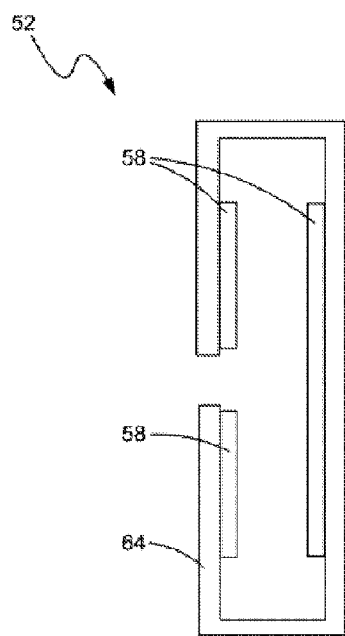
FIG. 3 is a top down view of a moving portion of a propulsion system in an exemplary embodiment.
Figure 4:
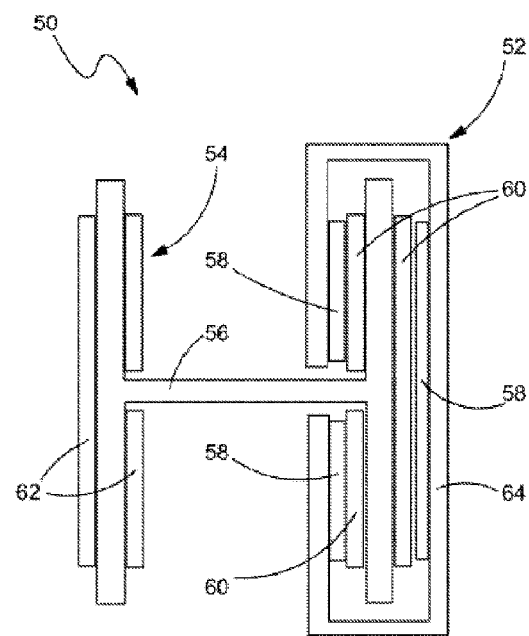
FIG. 4 is a top down view of a stationary portion and a moving portion of a propulsion system in an exemplary embodiment.
Figure 5:
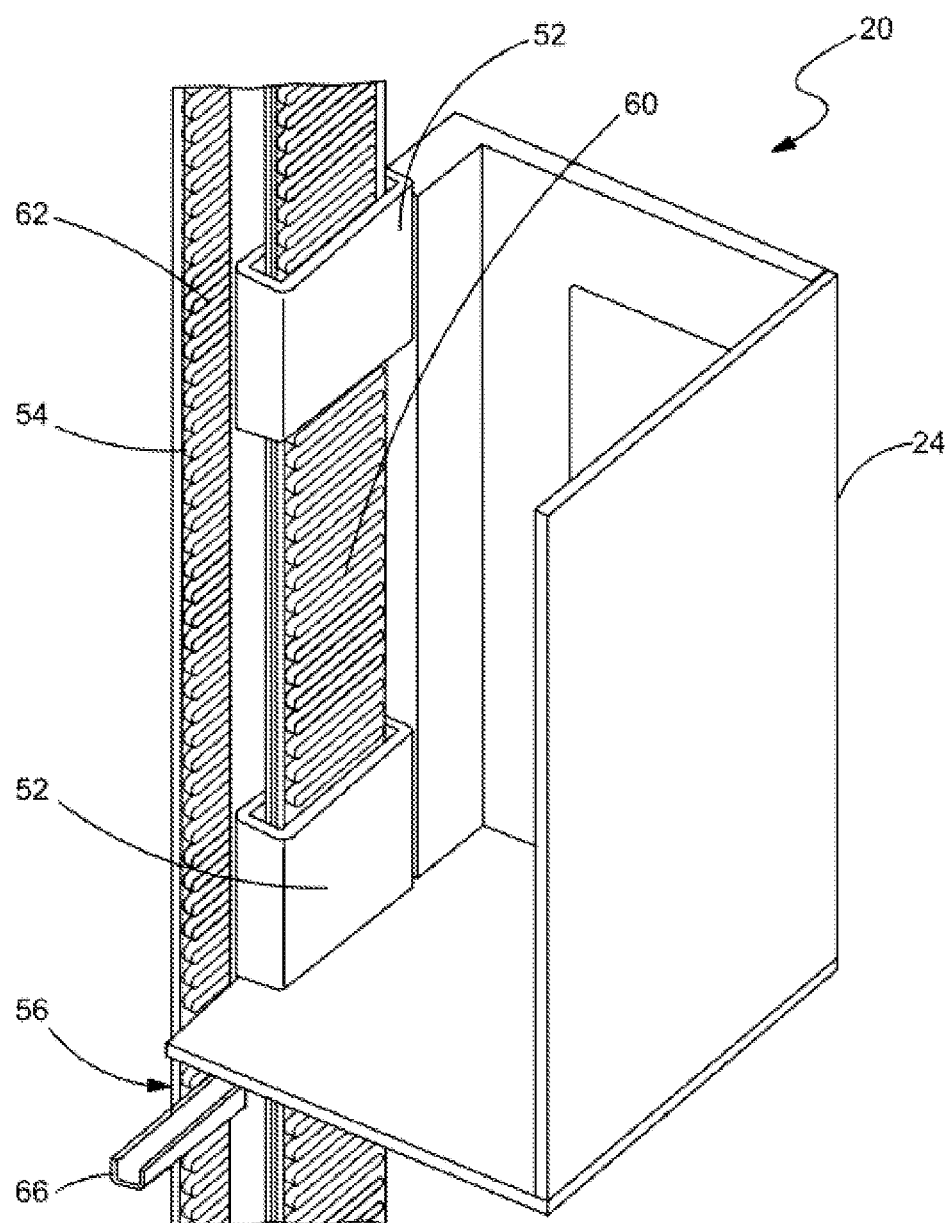
FIG. 5 is a perspective view of an elevator car and a propulsion system in an exemplary embodiment.

Referring now to FIG. 1, an exemplary embodiment of a ropeless elevator system 20 is shown. The elevator system 20 is shown for illustrative purposes to assist in disclosing various embodiments of the invention. As is understood by a person skilled in the art, FIG. 1 does not depict all of the components of an exemplary ropeless elevator system, nor are the depicted features necessarily included in all ropeless elevator systems.

The ropeless elevator system 20 may include a first hoistway 22 in which one or more elevator cars 24 travel upward and a second hoistway 26 in which the elevator cars 24 travel downward. The ropeless elevator system 20 may transport elevator cars 24 from a first floor 28 to a top floor 30 in the first hoistway 22. Conversely, the ropeless elevator system 20 may transport elevator cars 24 from the top floor 30 to the first floor 28 in the second hoistway 26. Further, the elevator cars 24 may also stop at intermediate floors 32 to allow ingress to and egress from an elevator car 24. The intermediate floors 32 may include any floors associated with the first hoistway 22 and/or the second hoistway 26 in between the top floor 30 and the first floor 28.

Above the top floor 30, an upper transfer station 34 may be positioned across the first and second hoistways 22, 26. The upper transfer station 34 may impart horizontal motion to elevator cars 24 to move the elevator cars 24 from the first hoistway 22 to the second hoistway 26. It is understood that upper transfer station 34 may be located at the top floor 30, rather than above the top floor 30. Additionally, a lower transfer station may be positioned across the first and second hoistways 22, 26 below the first floor 28. The lower transfer station 36 may impart horizontal motion to the elevator cars 24 to move the elevator cars 24 from the second hoistway 26 to the first hoistway 22. It is to be understood that lower transfer station 36 may be located at the first floor 28, rather than below the first floor.

The first hoistway 22, the upper transfer station 34, the second hoistway 26, and the lower transfer station 26 may comprise a loop 38 in which the cars 24 circulate to the plurality of floors 28, 30, 32 and stop to allow the ingress and egress of passengers to the floors 28, 30, 32.

With reference to FIGS. 2-7, a propulsion system 50, which may be included in the elevator system 20, is shown. The propulsion system 50 may be disposed on the elevator cars 24 in the hoistways 22, 26 and in the transfer stations 34, 36. The propulsion system 50 may generate thrust to impart vertical motion to elevator cars 24 to propel the elevator cars 24 from one level to the next within the hoistways 22, 26 and into and out of the transfer stations 34, 36. The propulsion system 50 may comprise a moving part 52 mounted on each elevator car 24 and a stationary part 54 mounted to a structural member 56 positioned within the hoistways 22, 26 and/or transfer stations 34, 36. The interaction of the moving part 52 and the stationary part 54 generates a thrust force to move the elevator cars 24 in a vertical direction within the hoistways 22, 26 and transfer stations 34, 36. Such a propulsion system 50 may be implemented, for example, as a linear motor.

In an example, the moving part 52 includes permanent magnets 58, while the stationary part 54 includes windings 60, 62 mounted on the structural member 56. Permanent magnets 58 may be attached to a support element 64 of the moving part 52, with the support element 64 coupled to the elevator car 24. Structural member 56 may be made of a ferromagnetic material and coupled to a wall of the first and/or second hoistways 22, 26 by support brackets 66. Windings 60, 62 may be formed about structural member 56. Windings 60 may comprise the stationary part of the propulsion system within the first hoistway 22 and windings 62 may comprise the stationary part of the propulsion system within the second hoistway 26. A support element 64 of the moving part 52 may be positioned about windings 60, 62 such that the windings 60, 62 and permanent magnets 58 are adjacent.

Windings 60 in the first hoistway 22 may be energized by a power source 68 to propel one or more elevator cars 24 upward in the first hoistway 22 and transfer stations 34, 36. When a voltage is applied to windings 60, the interaction between windings 60 and permanent magnets 58 impart motion to the elevator car 24. Windings 62 in the second hoistway 26 operate as a regenerative brake to control descent of the elevator car 24 in the second hoistway 26 and transfer stations 34, 36. Windings 62 may also provide a current back to the drive unit, for example, to recharge an electrical system.

Figure 6:
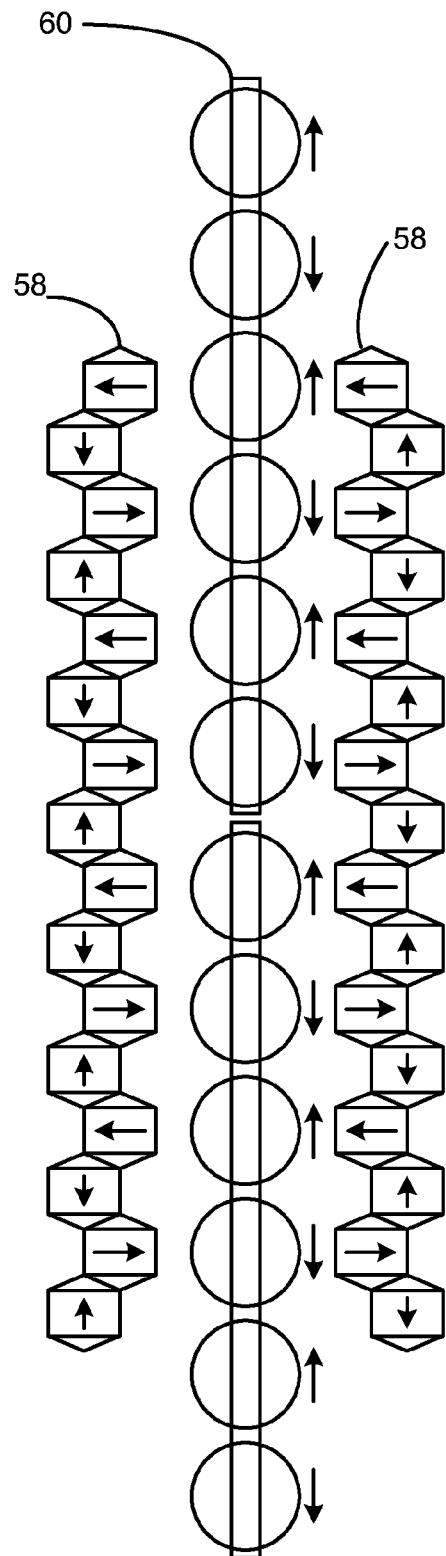
FIG. 6 is a schematic drawing of a propulsion system in an exemplary embodiment.

Further detailing the interaction between the permanent magnets 58 and the windings 60, FIG. 6 illustrates an exemplary arrangement of permanent magnets 58 relative to the windings 60. As seen in FIGS. 2-5, the permanent magnets 58 are attached to the elevator car 24 by way of the moving part 52. As such, the illustrated series of permanent magnets 58 may repeat for the full height of the elevator car 24.

The permanent magnets 58 may be arranged in a Hallbach array. A Hallbach array is a specific arrangement of the permanent magnets 58 that augments the magnetic field on one side of the permanent magnets 58 while cancelling the field to near zero on the other side of the permanent magnets 58. A Hallbach array is formed by arranging the permanent magnets 58 in a spatially rotating pattern of magnetization. The permanent magnets 58 of FIG. 6 include arrows denoting the direction of magnetization for each individual permanent magnet 58, exemplifying a Halbach array. Such an arrangement may produce a greater magnetic field on a desired side while eliminating a stray magnetic field on the opposite side.

Situated between the permanent magnets 58, the windings 60, associated with the stationary part 54, may include groups of coils arranged linearly about the hoistway 22 in multi-phase arrangements. Magnetic flux is created by the windings 60 when a current is applied to the windings 60. Magnetic fields produced by the flux of the windings 60 are represented by the circles of FIG. 6 and the arrows at each circle indicate the direction of the flux around said circle. In the context of the windings 60, the magnetic poles will translate as currents when they are changed in the coils, following the methods of vector control known in the art.

Figure 7:
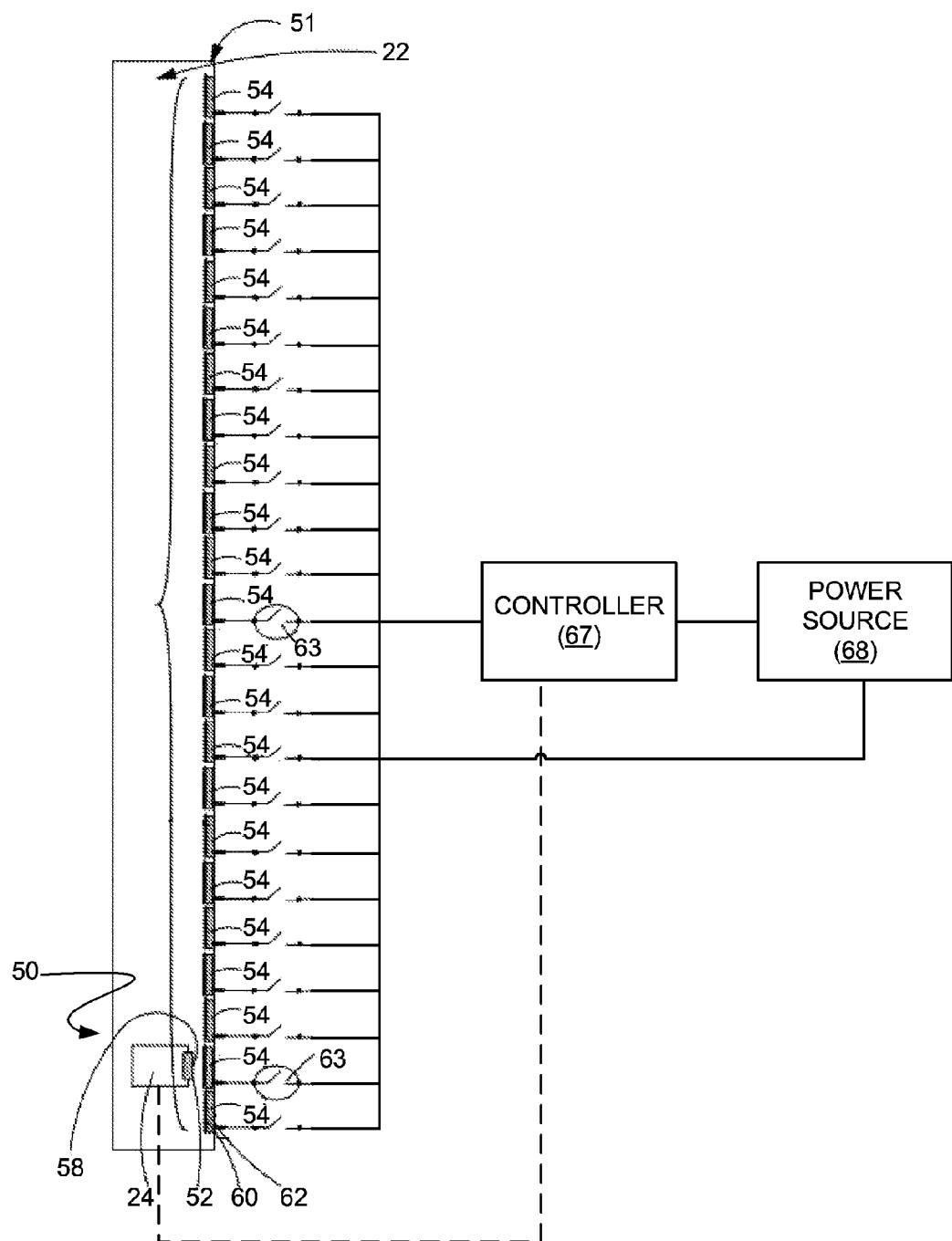
FIG. 7 is a schematic view of configurations for magnets and windings of a propulsion system in an exemplary embodiment.

FIG. 7 further illustrates an example propulsion system 50 having a track 51 disposed in the hoistway 22. The track 51 may comprise a plurality of stationary parts 54. Similar to FIGS. 2-6, each stationary part 54 includes a plurality of windings 60 mounted thereto. Each stationary part 54 may be individually energized by the power supply 68, wherein the power from the power supply 68 may be activated/deactivated using a respective member of the plurality of switches 63 associated with the plurality of stationary parts 54.

The elevator car 24, including the moving part 52, may be disposed along the track 51. The moving part 52, including the permanent magnets 58, may interact with the plurality of stationary parts 54. The windings 60 of a stationary part 54 may receive power from the power supply 68 when the moving part 52 of the elevator car 24 is aligned with the stationary part 56 on the track 51. The controller 57 may send/receive signals to/from the stationary parts 56 to activate members of the plurality of stationary parts 56 where the elevator car 24 is located to propel the elevator car 24.

Figure 8:
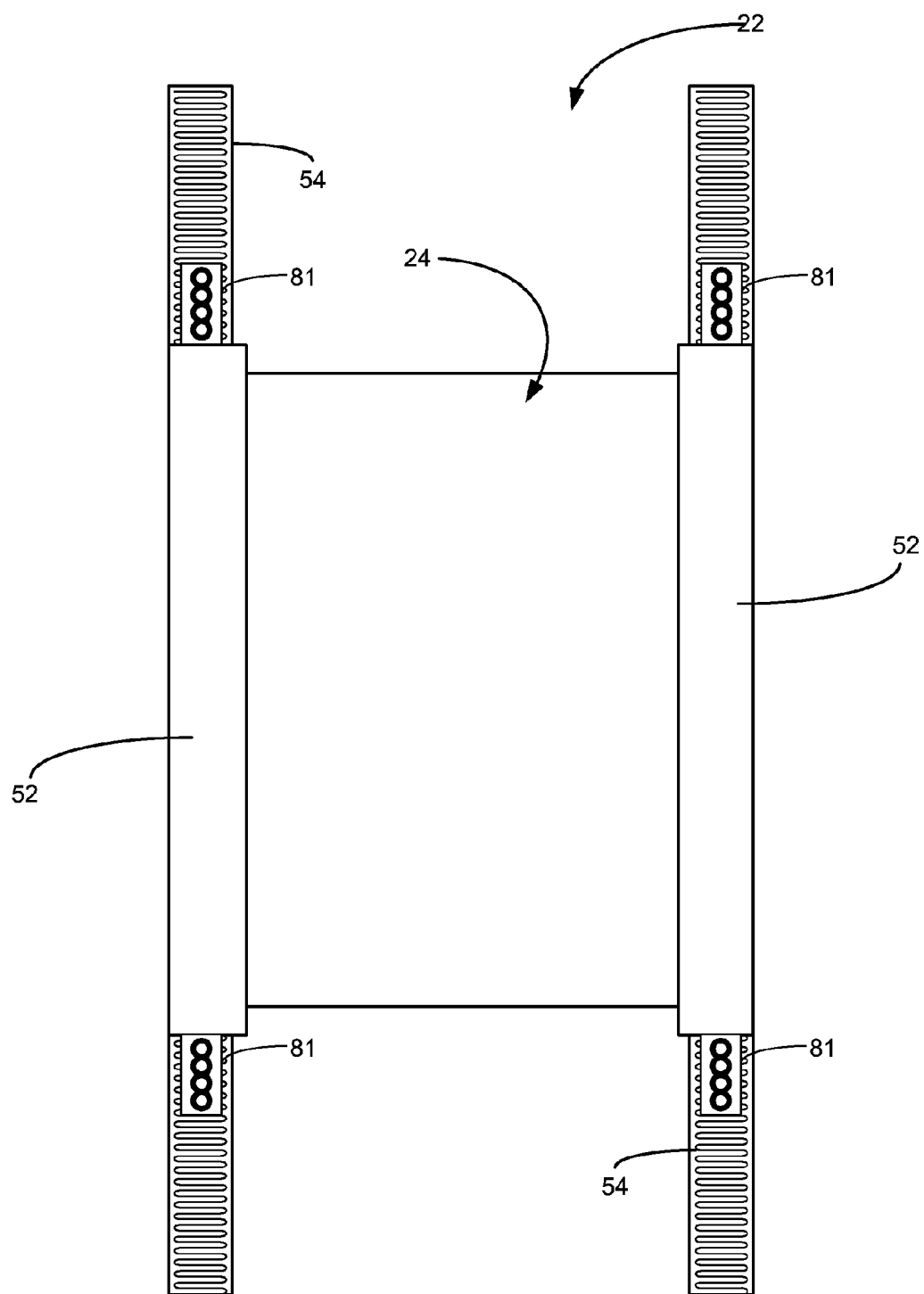
FIG. 8 is a side view of an exemplary elevator car in a hoistway.
Figure 9:
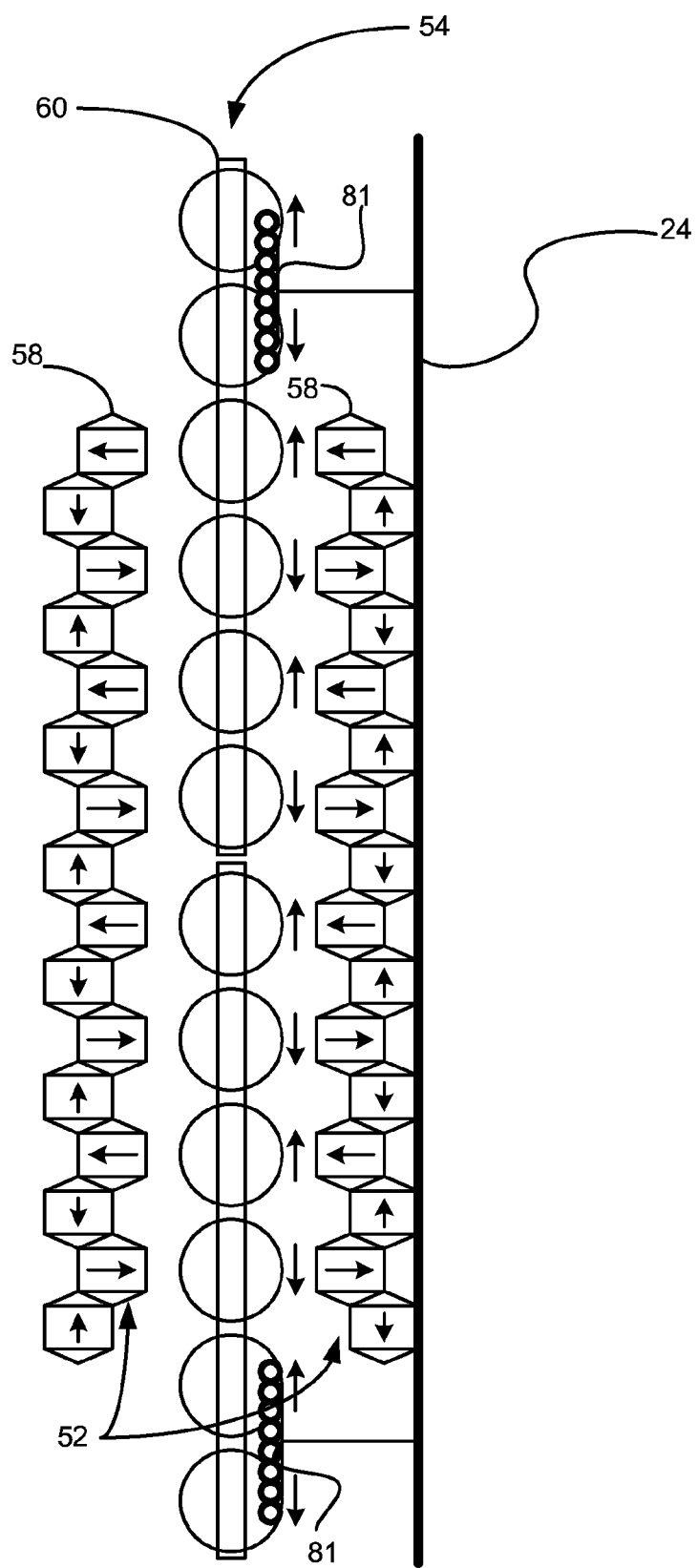
FIG. 9 is a schematic side view of a propulsion system associated with the exemplary elevator car of FIG. 8.

Turning now to FIGS. 8 and 9, the elevator car 24 is shown in the hoistway 22, wherein an array of Hall effect sensors 81 are disposed on the elevator car 24 in close proximity to the moving part 52 and the magnets 58 therein. A Hall effect sensor 81 is a transducer that produces an output voltage signal in response to magnetic fields and/or variances in magnetic fields.

A Hall effect sensor 81 may determine the magnitude and polarity of a magnetic field passing across the Hall effect sensor 81 (as shown in FIG. 9). Magnetic poles produced by the currents in the windings 60 are the locations where the strength of the field is highest. An array of Hall effect sensors 81 can be used to determine the locations of the north and south poles produced by currents in the windings 60, relative to the position of the sensors. Because the position of the Hall effect sensors 81 are known, relative to the magnets 58, output from the array of Hall effect sensors can be used to determine the position of the magnetic field produced by the currents carried by the windings 60, relative to the position of the magnets 58. In the present example, the desired field orientation of the currents carried by the windings 60 may be known and compared the magnetic field sensed by the Hall effect sensors 81 to determine if field orientation is correct. Thus, the array of Hall effect sensors 81 can determine a field orientation of the currents carried by the windings 60, relative to the magnets 58, using the array of Hall effect sensors 81.

The array of Hall effect sensors 81 may determine if the permanent magnet 58 of the elevator car 24 is properly aligned with the windings 60 by determining the position of the magnetic field generated by the windings relative to the positions of the magnetic poles in the permanent magnets 58. As seen in the arrangement of FIG. 9, segments of the energized windings 60 may extend beyond the array of magnets at the top and/or bottom of the elevator car when the moving part 52 and a stationary part 54 are properly aligned. Because the magnitude and angle of the current supplied to the stationary part 54 and the physical spacing between the magnets and the Hall effect sensors 81 may be configured and known, the propulsion system 50 itself and/or an optional associated controller (e.g., the controller 67) may be able to determine the magnetic field orientation of the magnets 58 relative to the windings 60 based on output from the Hall effect sensors 81.

As the elevator car 24 and its associated permanent magnets 58 move, the feedback produced by the Hall effect sensors 81 may be used to verify that the next series of windings 60 is properly functioning when the elevator car 24 arrives in alignment with said series of windings 60, thereby performing a fault detection function. The position of the coil segments of the windings 60 are known because the power/current levels produced by individual drives provided by the power source 68 are known. Using the Hall effect sensors 81, the absolute positioning of the magnets 58 relative to the windings 60 can be determined within a given accuracy of a number of electrical degrees based on the pole pitch of the windings 60.

Maintaining proper field orientation for the windings 60 relative to the magnets 58 ensures that the currents from the windings 60 and the magnetic fields of the permanent magnets 58 are oriented correctly for optimal thrust generation and control. As the windings 60 may repeat as a series of sections about the hoistway 22, maintaining field orientation is useful to ensure proper section(s) of windings 60 are energized and energized at correct levels to ensure proper function of the propulsion system 50. The Hall effect sensors 81 may have the function of determining if the section(s) of windings above or below the elevator car 24 are properly activated based on known field levels for faultless conditions, as the magnetic field generated by the windings should have the same relationship to the permanent magnets 58 as they move with the elevator car 24. For example, when the array of Hall effect sensors 81 is detecting the magnetic field of the windings 60, the Hall effect sensors 81 should always detect north and south poles in the same location because the poles should move together. Such maintenance of pole positioning of the elements of the propulsion system 50 is useful in controlling the propulsion system 50.

Figure 10:
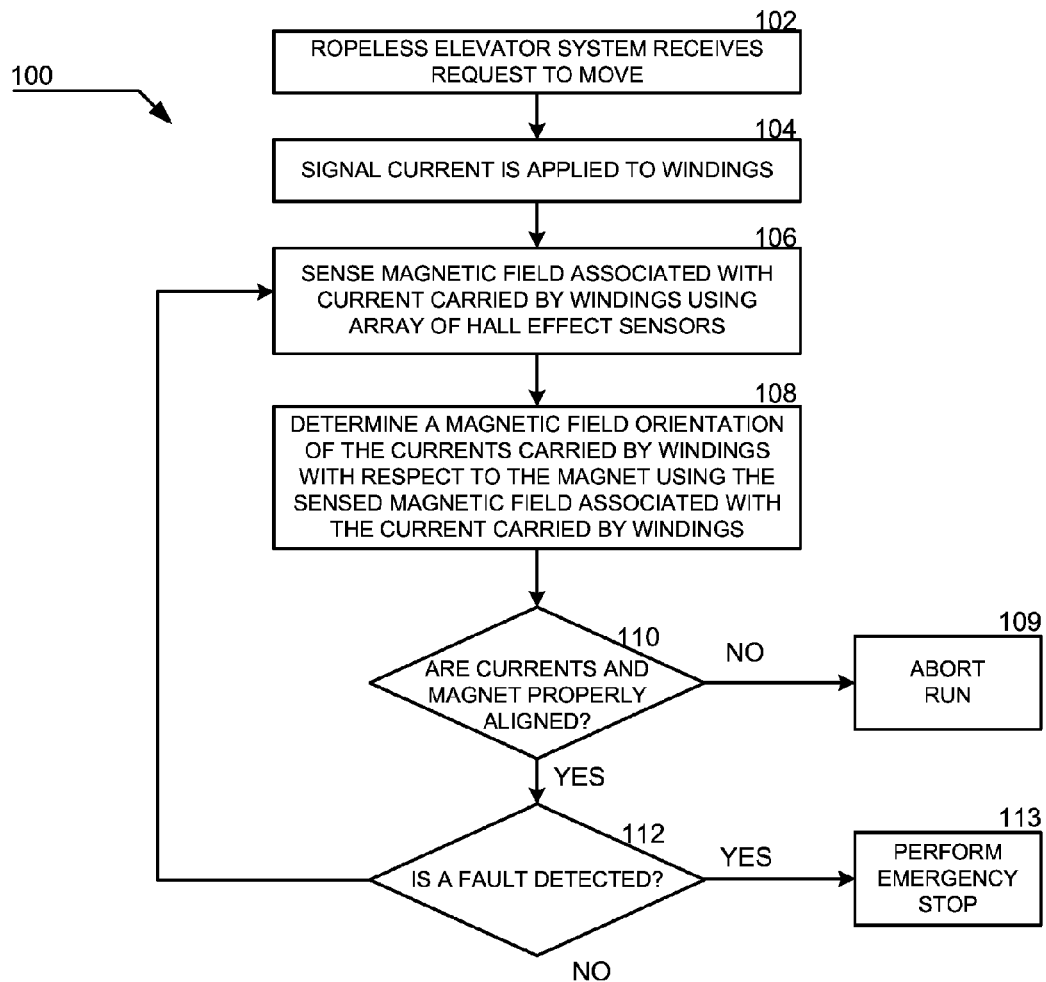
FIG. 10 is example flow chart illustrating an embodiment of a method for operating a ropeless elevator system.

However, if the magnetic poles change when moving to another segment of the windings 60, then the propulsion system 50 may be experiencing a problem. Additionally or alternatively, if no field is detected then the propulsion system 50 may not be functioning correctly. Therefore, such field orientation monitoring systems are useful in fault detection of the propulsion system. Detecting such faults and/or propulsion problems may trigger a safety stop for the elevator car FIG. 10 illustrates a flowchart 100 detailing a method of operation for a ropeless elevator system 20. At block 102, the ropeless elevator system 20 receives a request to move. The request to move may come from the controller 57 and/or any other signals which the elevator system 20 recognizes as a valid request to move. If a valid request to move is received, a current will be applied to the windings 60 (block 104). The array of Hall effect sensors 81 associated with the elevator system 20 is used to sense a magnetic field associated with the electrical currents carried by the windings 60 (block 106). Using the sensed magnetic field associated with the electrical currents carried by the windings, a magnetic field orientation of the electrical currents carried by the windings with respect to the magnet is determined (block 108).

Continuing to decision 110, the method 100 may determine if the electrical currents carried by the windings 60 and the magnet 58 are properly aligned for functions of the propulsion system 50. Said decision 110 is determined using the magnetic field orientation of block 108. If the windings are not properly aligned, the run of the elevator system 20 is aborted. However, if windings are properly aligned, then the process continues.

Additionally, the magnetic field orientation determined at block 108 may be used for a fault detection operation (decision 112). The magnetic field orientation may be used to check if pole positions align between the magnet 58 and windings 60, if the proper section of windings 60 are carrying currents, and/or any other power or alignment based discrepancy from a recognized normal condition. If the fault detection operation determines that a fault is present, then the elevator system 20 may perform an emergency stop function (block 113).

INDUSTRIAL APPLICABILITY

From the foregoing, it can be seen that the technology disclosed herein has industrial applicability in a variety of settings such as, but not limited to, systems and methods for determining field orientation of magnetic components in a ropeless elevator system. Using the teachings of the present disclosure, ropeless elevator systems may be provided with proper systems and methods for safely monitoring the field orientation of windings, with respect to permanent magnets, of a propulsion system. The field orientation is an important factor in providing fault detection methods and control methods for an elevator system. The systems and methods herein may also provide for verification means with respect to the health of apparatus and individual apparatus functions associated with the propulsion system.

While the present disclosure has been in reference to systems and methods for determining field orientation of magnetic components in a ropeless elevator system, one skilled in the art will understand that the teachings herein can be used in other applications as well. It is therefore intended that the scope of the invention not be limited by the embodiments presented herein as the best mode for carrying out the invention, but that the invention will include all equivalents falling within the spirit and scope of the claims as well.

What is claimed is:

1. A ropeless elevator system (20) comprising:
an elevator car (24);
a hoistway 22 in which the elevator car (24) travels;
a ropeless propulsion system (50), the ropeless propulsion system (50) comprising:
electrical windings (60) energized by a power source (68), the electrical windings (60) affixed to a stationary structure (54), the stationary structure (54) associated with the hoistway (22); and
a magnet (58), the magnet (58) affixed to a moving structure (52), the moving structure (52) associated with the elevator car (24), and interaction between the electrical windings (60) and the magnet (58) generates a thrust force on the elevator car (24) traveling in the hoistway (22); and
an array of Hall effect sensors (81), the array of Hall effect sensors (81) determining a sensed magnetic field, the sensed magnetic field being associated with electrical currents carried by the windings (60) and used to determine a magnetic field orientation of the electrical currents carried by the windings (60) with respect to the magnet (58).

2. The ropeless elevator system (20) of claim 1, wherein the magnetic field orientation of the electrical currents carried by the windings (60) with respect to the magnet (58) is used to determine if the windings (60) and the magnet (58) are aligned for proper function of the propulsion system (50).

3. The ropeless elevator system (20) of claim 1, wherein the magnetic field orientation of the electrical currents carried by the windings with respect to the magnet (58) is used to perform fault detection operations for the propulsion system (50).

4. The ropeless elevator system (20) of claim 1, wherein the array of Hall effect sensors (81) are disposed on the elevator car (24).

5. The ropeless elevator system (20) of claim 4, wherein at least one member of the array of Hall effect sensors (81) is disposed in close proximity to a top portion of the moving structure (52).

6. The ropeless elevator system (20) of claim 4, wherein at least one member of the array of Hall effect sensors (81) is disposed in close proximity to a bottom portion of the moving structure (52).

7. The ropeless elevator system (20) of claim 1, wherein the magnet (58) comprises a series of permanent magnets.

8. The ropeless elevator system (20) of claim 7, wherein the series of permanent magnets are arranged in a Hallbach array.

9. The ropeless elevator system (20) of claim 1, wherein the windings (60) are arranged in a multi-phase arrangement.

10. A method for operating a ropeless elevator system (20), the ropeless elevator system including an elevator car (24) and a hoistway (22) in which the elevator car (24) travels, the method comprising:
generating a thrust force on the elevator car (24) traveling in the hoistway (22), wherein the thrust force is generated by a ropeless propulsion system (50), the ropeless propulsion system (50) comprising:
electrical windings (60) energized by a power source (68), the electrical windings (60) affixed to a stationary structure (54), the stationary structure (54) associated with the hoistway (22); and
a magnet (58), the magnet (58) affixed to a moving structure (52), the moving structure (52) associated with the elevator car (24) and interaction between the electrical windings (60) and the magnet (58) generates the thrust force;

determining a sensed magnetic field, using an array of Hall effect sensors (81), the sensed magnetic field associated with electrical currents carried by the windings (60); and determining a magnetic field orientation of the electrical currents carried by the windings (60) with respect to the magnet (58) using the sensed magnetic field associated with the windings (60).

11. The method of claim 10, further comprising determining if the electrical currents carried by the windings (60) and the magnet (58) are aligned for proper function of the propulsion system (50) using the magnetic field orientation of the electrical currents carried by the windings (60) with respect to the magnet (58).

12. The method of claim 10, further comprising performing fault detection operations for the propulsion system (50) using the magnetic field orientation of the electrical currents carried by the windings (60) with respect to the magnet (58).

13. The method of claim 12, further comprising performing an emergency stop operation of the elevator car (24) if a fault is detected, the fault determined by the fault detection operations for the propulsion system (50).

14. The method of claim 10, wherein the array of Hall effect sensors (81) are disposed on the elevator car (24).

15. The method of claim 10, wherein the magnet (58) comprises a series of permanent magnets.

16. The method of claim 15, wherein the series of permanent magnets are arranged in a Hallbach array.

17. The method of claim 10, wherein the windings (60) are arranged in a multi-phase arrangement.

18. The method of claim 10, further comprising determining, using the magnetic field orientation of the windings (60) with respect to the magnet (58), if the magnet (58) is properly aligned with the windings (60) prior to startup operations of the elevator car (24).

19. A propulsion system (50) for a ropeless elevator system (10), the ropeless propulsion system (50) comprising:

electrical windings (60) energized by a power source (68), the electrical windings (60) affixed to a stationary structure (54);

a magnet (58), the magnet (58) affixed to a moving structure (52), and interaction between the electrical windings (60) and the magnet (58) generates a thrust force; and an array of Hall effect sensors (81), the array of Hall effect sensors (81) determining a sensed magnetic field, the sensed magnetic field being associated with electrical currents carried by the windings (60) and used to determine a magnetic field orientation of the electrical currents carried by the windings (60) with respect to the magnet 58.

20. The propulsion system of claim 19, wherein the magnet is a series of permanent magnets arranged in a Hallbach array.

* * * * *